UNITED STATES PATENT OFFICE.

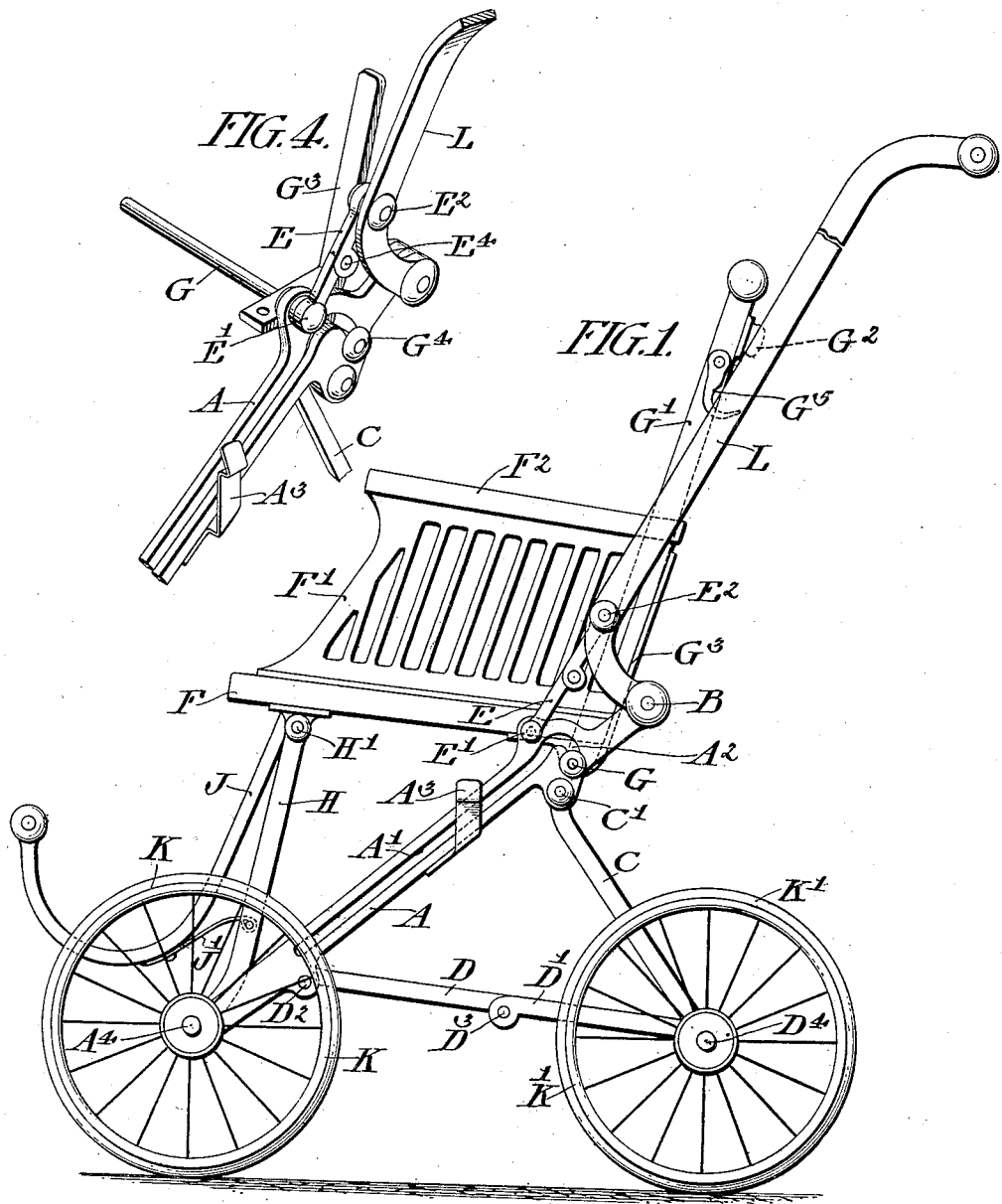

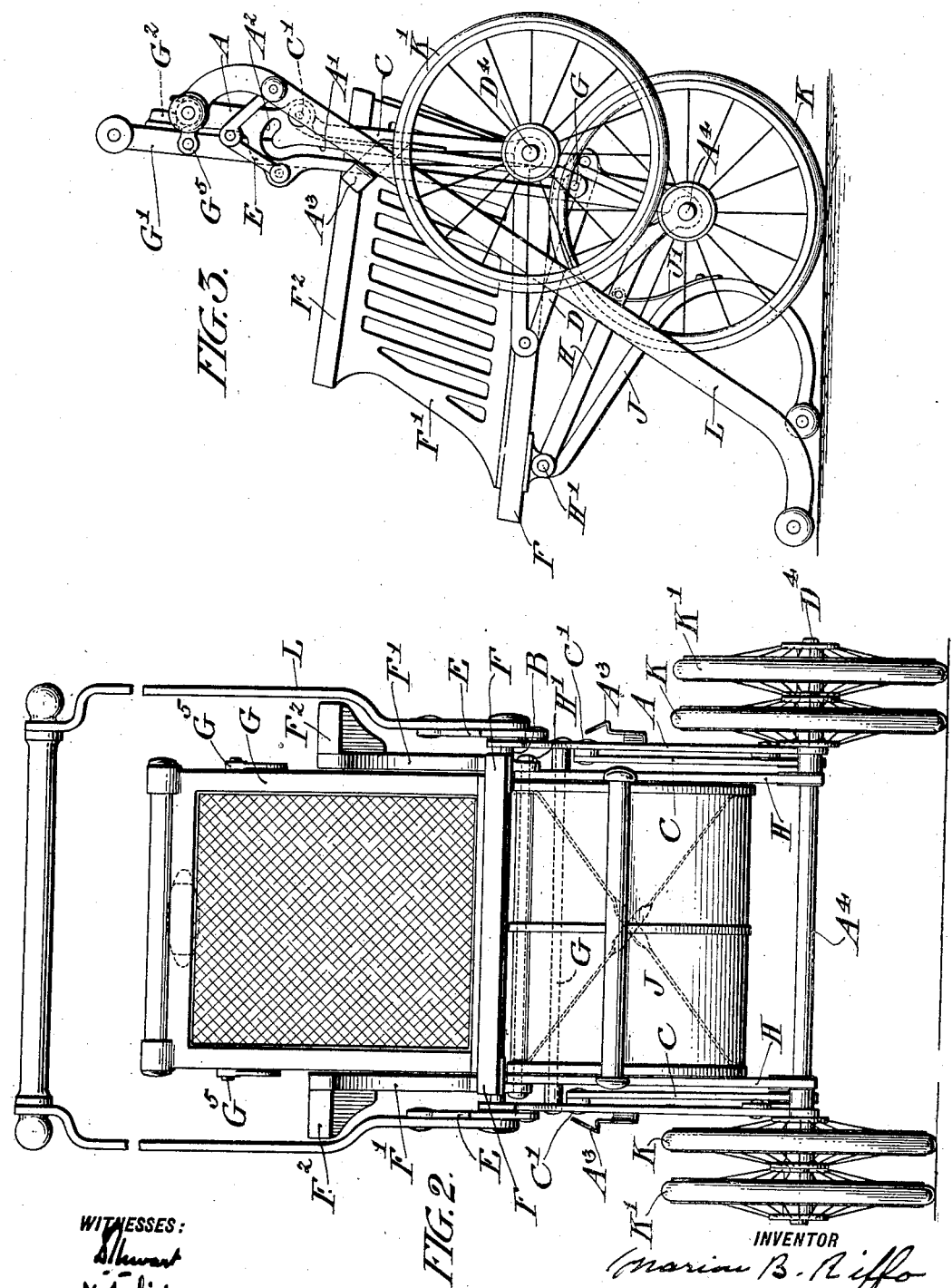

MARION B. RIFFO, OF PHILADELPHIA, PENNSYLVANIA.

FOLDING GO-CART.

No. 879,907.  Specification of Letters Patent.  Patented Feb. 25, 1908.

Application filed June 26, 1907. Serial No. 380,857.

*To all whom it may concern:*

Be it known that I, MARION B. RIFFO, a citizen of the United States of America, residing in the city and county of Philadelphia, in the State of Pennsylvania, have invented a certain new and useful Improvement in Folding Go-Carts, of which the following is a true and exact description, reference being had to the accompanying drawings, which form a part thereof.

My present invention relates to that type of light carriage or go-cart in which the parts normally unite to form a vehicle of the usual character for wheeling infants or small children about, but can be collapsed or folded into a comparatively small space to facilitate the storage of the carriage or its transportation when the circumstances do not permit it to be used as a perambulator.

The object of my present invention is to provide a carriage of relatively inexpensive and simple construction in which the parts may be quickly and easily converted from the normal running form or condition into the folded form or condition or vice versa and in which the conversion from one form to the other can be made without disturbing the occupant, and in which the parts when in the folded condition form a compact and convenient device for carrying the occupant. So far as I am aware, I am the first to devise a carriage possessing all of these advantages.

The various features of novelty which characterize my invention are pointed out with particularity in the claims annexed to and forming a part of this specification. For a better understanding of my invention, however, and the advantages possessed by it reference may be had to the accompanying drawings and descriptive matter in which I have illustrated and described one of the forms in which my invention may be carried out.

Of the drawings, Figure 1 is a side elevation of the carriage in its normal or perambulating condition. Fig. 2 is an elevation taken at right angles to Fig. 1. Fig. 3 is a view taken similarly to Fig. 1 but showing the carriage in its collapsed or folded condition, and, Fig. 4 is a perspective view of a portion of the framework.

In the drawings, F represents the bottom, and F$^1$ the sides of the carriage body or seat portion. F$^2$ are outwardly extending arm rests carried at the tops of the side portions. To the under side of the bottom portion F at its front end is secured a bar or rod H$^1$. A front wheel frame formed of links or members H hinged on the bar H$^1$ supports the axle A$^4$ on which the front wheels K are journaled. A pair of side frame members A are hinged to the front wheel frame as by journaling each member A on the axle A$^4$ between the adjacent wheel and member H. Each member A is provided with an elongated slot A$^1$ having a transversely extending portion A$^2$ at its upper end. The slot A$^1$ in each bar receives the corresponding end guides of a shaft G secured to the under side of the seat bottom F at its rear end.

In the perambulating condition of the carriage shown in Fig. 1 the ends of the bars G rest in and are supported by the walls of the transversely extending portions A$^2$ of the slots A$^1$. A rear wheel frame or support is formed by links C connected to the side frames A by pintles C$^1$ adjacent the transverse slot portions A$^2$. The rear wheel frame supports the axle D$^4$ carrying the rear wheels K$^1$. Each end of the axle D$^4$ is also connected to the frame member A adjacent to the front axle A$^4$ by an elbow brace formed of links D, D$^1$. Each link D is pivoted to the corresponding frame member A at D$^2$, and each link D$^1$ is pivoted to the axle D$^4$. The links D and D$^1$ of each brace are pivoted together at D$^3$, the connection being such that the pivotal connection D$^3$ can move up but not down from the position shown in Fig. 1. A member G$^1$, having a handle G$^2$ near its upper end, forms a back for the carriage body which is adjustable to some extent between the side arms F$^1$ by means of a hinge connection with the shaft G. Brackets G$^3$ may be arranged to form stops for the backward movement of the member G$^1$. A yoke-shaped handle L for operating the carriage as a perambulator has its ends pivoted on the ends of a bar B connecting the upper ends of the frame members A. Elbow braces E normally hold the handle L rigid with respect to the frame member A, as shown. Each brace E consists of a pair of links pivotally connected together at E$^4$, and having one link pivoted to the corresponding frame member A at E$^1$, and the other link pivoted to the corresponding end of the handle L at E$^2$. A foot rest J is hung on the bar H$^1$, and is connected to the members H by straps J$^1$.

With the position of the parts shown in

Fig. 1, the carriage can be employed as a perambulator in the usual way. The weight of the seat or body portion effectually secures the ends of the member G in the ends of the transverse slot portions A². This holding action may be supplemented by latches connecting the seat portion and side frames A if thought desirable but I do not regard such latches as necessary.

When it is desired to collapse the vehicle, as to take it on a street car or the like, the operator may readily do this by holding the axle D⁴ stationary, and shifting the carriage body by the handle G² to carry the ends of the bar G out of the transverse portions A² of the slots in the members A and into the longitudinal portions of the slots. The body of the carriage is then allowed to descend, and the ends of the bar G travel down in the slots A¹. During this part of the operation the front wheel frame folds under the vehicle into the position shown in Fig. 3, and the frame members A are carried into a substantial vertical position, lifting the rear wheels off the ground. While this transformation is being carried out, or after it is completed, the operator lifts first one and then the other of the pivot points D³ and thus allows the braces D to collapse, so that the frame members C swing into substantial parallelism with the frame members H, thus carrying the wheels K¹ into the position shown in Fig. 3. The tread of the wheels K¹ is made sufficiently wider than that of the wheels K so that the wheels K¹ can clear the wheels K. The braces E are then collapsed, and the handle L drawn forward into the position in which it is held by the spring retainers A³ secured to the side frames A shown in Fig. 3. This completes the conversion of the vehicle into the folded form. It is apparent that the vehicle can be readily converted from the folded form of Fig. 3 into the normal running form of Fig. 1 with ease by reversing the steps necessary to convert it from the running form into the folded form.

When in the folded form, the vehicle is very compact, and the occupant, which need not have been disturbed in the conversion, can be readily transported with the carriage by the handle G² and bar B, the parts being so arranged that the bar B and handle G² come together and may be simultaneously grasped by one hand of the operator. The parts may be secured in this position by latches G⁵ carried by the back G¹ and engaging the bar B when the latter is in the collapsed condition. While I have shown the back G¹ as occupying a position in Fig. 3 different from that of Fig. 1, it is obvious that by a different arrangement of parts, as by increasing the distance between parts B and G¹ in Fig. 1, the bar B and handle G² may be brought together with the back G¹ in the position of Fig. 1.

Having now described my invention, what I claim as new and desire to secure by Letters Patent is:

1. A folding go-cart or carriage comprising a seat or body portion, a front wheel frame hinged to the body portion adjacent its front end, side frames connected to the front wheel frame at points remote from the connection of the latter to the seat or body portion, rear wheel supports connected to the side frames, and means for detachably securing the side frames to the seat or body portion to hold the parts in position to permit the carriage to be used as a perambulator, the parts being so arranged that when the side frames are released the front wheel frame may be folded under the seat or body portion and the side frames and the rear wheel supports lifted with respect to the body or seat portion.

2. A folding go-cart or carriage comprising a seat or body portion, a front wheel frame hinged to the body portion adjacent its front end, side frames hinged to the front wheel frames at points remote from the connection of the latter to the seat or body portion and slidingly connected to the seat or body portion adjacent its rear end, rear wheel supports connected to the side frames and means for detachably securing the side frames to the seat or body portion to hold the parts in position to permit the carriage to be used as a perambulator, the parts being so arranged that when the side frames are released they may be slid upward with respect to the body or seat portion to fold the front wheel frame under the said body or seat portion and raise the rear wheel supports.

3. A folding go-cart or carriage comprising a seat or body portion, a front wheel frame hinged to the body portion adjacent its front end, side frames hinged to the front wheel frame at points remote from the connections of the latter to the seat or body portion, said side frames being provided with longitudinal slots terminating at their upper ends in transverse downwardly extending portions, rear wheel supports connected to the side frames, pintles or projections carried by the seat or body portion adjacent its rear end which enter the slots in the side frames and rest in the transverse portions thereof to hold the carriage in the perambulator condition, but may be moved into the longitudinal slot portions to permit the carriage to be collapsed.

4. A folding go-cart or carriage comprising a seat or body portion, a front wheel frame hinged to the body portion adjacent its front end, side frames hinged to the front wheel frame at points remote from the connection of the latter to the seat or body portions, sliding connections between the side frames and the body or seat portion, rear wheel supports hinged to the side frames, collapsible braces extending between the side frames and the rear wheel supports, and means for detachably securing the side frames to the seat or body portion to hold the parts in position to permit the carriage to be used as a perambulator, the parts being so arranged that the carriage may be collapsed by sliding the side frames relative to the seat or body portion to fold the front wheel frame under the body portion and by collapsing said braces to permit the rear wheel supports to be turned toward the front wheel frame.

5. A folding go-cart or carriage comprising a seat or body portion, a front wheel frame hinged to the body portion adjacent its front end, side frames hinged to the front wheel frame at points remote from the connection of the latter to the seat or body portion, sliding connections between the side frames and the body or seat portion, rear wheel supports hinged to the side frames, collapsible braces extending between the side frames and the rear wheel supports, means for detachably securing the side frames to the seat or body portion to hold the parts in position to permit the carriage to be used as a perambulator, the parts being so arranged that the carriage may be collapsed by sliding the side frames relative to the seat or body portion to hold the front wheel frame under the body portion and by collapsing said braces to permit the rear wheel support to be turned toward the front wheel frame, and a handle for manipulating the carriage as a perambulator, and a second handle for use in converting the carriage from one form into the other and in carrying the carriage and its occupant when the carriage is in its collapsed or folded form.

6. A folding go-cart or carriage comprising a seat or body portion, a front wheel frame hinged to the body portion adjacent its front end, side frames connected to the front wheel frame at points remote from the connection of the latter to the seat or body portion, rear wheel supports connected to the side frames, means for detachably securing the side frames to the seat or body portion to hold the parts in position to permit the carriage to be used as a perambulator, the parts being so arranged that the carriage may be collapsed when the side frames are released by folding the front wheel frame under the seat or body portion and elevating the side frames and rear wheel supports relative to the body or seat portion, and means for detachably securing said parts in the collapsed condition.

7. A folding go-cart or carriage comprising a seat or body portion, a front wheel frame hinged to the body portion adjacent its front end, side frames connected to the front wheel frame at points remote from the connection of the latter to the seat or body portion, rear wheel supports connected to the side frames, means for detachably securing the side frames to the seat or body portion to hold the parts in position to permit the carriage to be used as a perambulator, the parts being so arranged that the carriage may be collapsed when the side frames are released by folding the front wheel frame under the seat or body portion and elevating the side frames and rear wheel supports relative to the body or seat portion, a handle $G^2$ connected to the body or seat portion, and a handle B connected to the side frame and brought into close proximity to the handle $G^2$ when the carriage is collapsed.

MARION B. RIFFO.

Witnesses:
S. THWART,
H. T. BENNETT.